(12) United States Patent
Wittenberg

(10) Patent No.: US 6,289,828 B1
(45) Date of Patent: Sep. 18, 2001

(54) TILLING AND SEEDING DEVICE

(76) Inventor: Robert H. Wittenberg, 665 E. Lake Blvd., Winona, MN (US) 55987

( * ) Notice: Subject to any disclaimer, the term of this patent is extended or adjusted under 35 U.S.C. 154(b) by 0 days.

(21) Appl. No.: 09/679,469

(22) Filed: Oct. 4, 2000

(51) Int. Cl.⁷ .................................................. A01C 5/02
(52) U.S. Cl. .............................................. 111/106; 111/96
(58) Field of Search .................................. 111/106, 107, 111/7.1, 7.2, 7.3, 7.4, 92, 95, 96, 97, 98; 172/21, 22

(56) References Cited

U.S. PATENT DOCUMENTS

| | | |
|---|---|---|
| 1,124,523 | 1/1915 | Reeser . |
| 2,747,528 * | 5/1956 | Hunkins .................. 111/92 |
| 2,865,315 | 12/1958 | Goldstein . |
| 4,011,612 | 3/1977 | Atkinson . |
| 4,165,697 * | 8/1979 | Yeager et al. .............. 111/106 |
| 4,206,714 | 6/1980 | Walsh . |
| 4,243,206 | 1/1981 | Heikkinen et al. . |
| 4,736,694 * | 4/1988 | Kratky et al. .............. 111/106 |
| 4,760,807 | 8/1988 | Keller . |
| 5,415,115 * | 5/1995 | Masuda et al. ............. 111/105 |
| 5,492,181 | 2/1996 | Grant . |

FOREIGN PATENT DOCUMENTS 1306212   2/1973   (GB) .

* cited by examiner

*Primary Examiner*—Robert E. Pezzuto
(74) *Attorney, Agent, or Firm*—M. Paul Hendrickson

(57) ABSTRACT

There is provided a manually operated seeding and tilling device having a tubular feed shaft equipped with a seed retaining chamber, a portal for loading the chamber with seeds, a handle for rotating a shaft about an orbital axis, a tined tilling member positioned at a distal end of the shaft and a seed valve regulating device for regulating the dispensing of seeds from the seed chamber. The tined tilling member serves to churn the soil such as ungrassed patches into a fluffy and uncompacted churned seed bed by rotating the shaft and tined members about its vertical axis with the handle. The rotating tines are then used to churn the seed dispensed from the device into the finished seed bed.

14 Claims, 3 Drawing Sheets

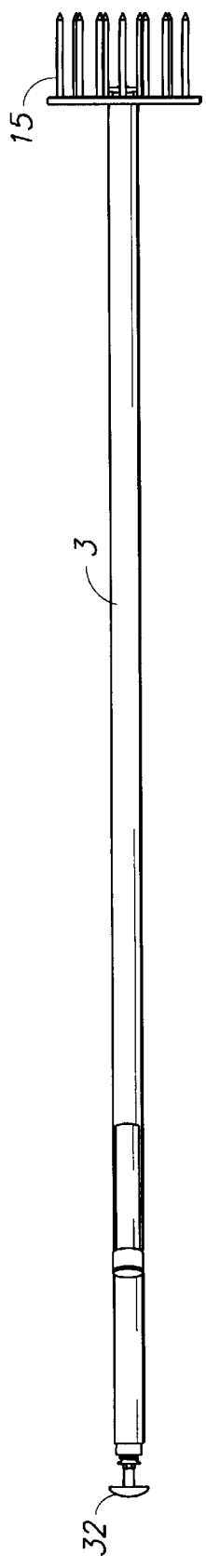
FIG. 4
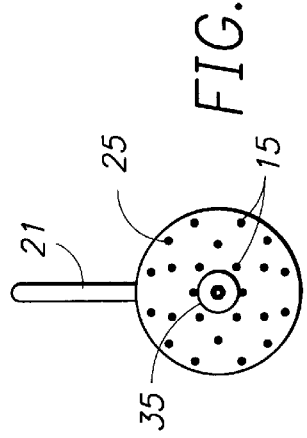
FIG. 5
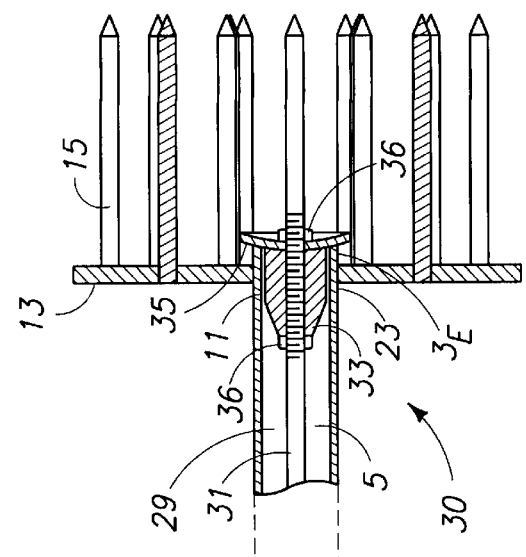
FIG. 6
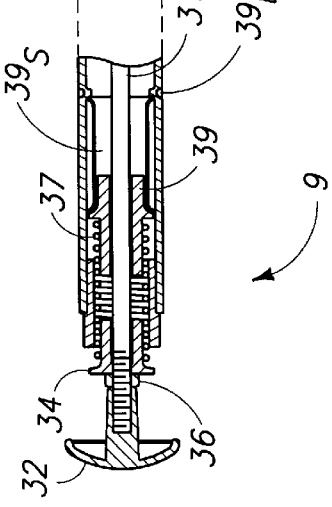

TILLING AND SEEDING DEVICE

FIELD OF THE INVENTION

The present invention pertains to a seeding device and more particularly to a seeding device equipped to manually till and seed a seed bed.

BACKGROUND OF THE INVENTION

Throughout the years a host of manually operated tilling devices have been proposed. In general, such devices are frequently used as tools to separately till and separately seed. In contrast, many power operated seeding devices can simultaneously furrow and seed the furrowed seed bed. The inability to provide hand operated seeders which may be effectively used to till and seed a tilled bed arises, in part, from the arts inability to devise a handy device capable of permitting the manipulative conduct of these two cooperative steps. Current devices often unduly strain and overtax the manipulative capabilities of the operator. Illustrative of manually operated seeding devices adapted to seed or spread seed upon a tilled seed bed may be found in U.S. Pat. No. 1,124,523 to W. J. Reeser which discloses a seed receptacle equipped with an adjustable valve plate. Similarly, U.S. Pat. No. 4,760,807 to P. Keller discloses a hand operated seed planter comprised of a hollow upright tube for containing grass seed and a seed transfer plate positioned on the bottom end of the tube. U.S. Pat. No. 4,206,714 to Walsh discloses a manually operated seeding device for separately preparing and then reseeding small bare spots in a lawn. File Walsh seeder includes scarifying teeth designed for separately scarifying a bare spot, an elongated telescoping tubular member, a hopper for holding grass seed, and a check valve assembly which regulates the amount of seed released to the scarified soil. U.S. Pat. No. 4,011,612 to Atkinson discloses a lawn and garden implement having an elongated hollow handle and a furrow-forming and closing head within which dispensed seed is seeded from the hollow handle into the furrowed soil. The Atkinson implement may be provided with various interchangeable tools for performing various gardening tasks. U.S. Pat. No. 1,124,523 to Reeser also provides a hand operated seed planting device equipped with a receptacle or container body, a removable closure cap and an adjustable valve plate. The Reeser valve plate contains a series of circular openings which regulate the quantity of dispensed seed.

As evident from the aforementioned, the heretofore planting devices typically necessitate independent tilllng followed by a separate seeding step. Manual devices designed to penetrate the soil and seed are not effective in proper seed bed preparation in that such devices typically rely upon making a compacted furrow, placing the seed in a furrow and then closing the furrow. This leaves much to be desired since effective seed bed preparation necessitates a fluffing, aerating and tilling of the seed bed into a soft, lightly compacted seed bed which in turn is ideally suited for promoting the nurturing and growth of the seeded seeds.

The inventor desired a manually operated device which would be capable of tilling a seed bed to a desired texture (e.g., lightly compacted) for seeding as opposed to those devices designed for furrowing and scarifying the seed bed. The tilling and seeding device would desirably be equipped to regulate the amount of seed seeded into the tilled seed bed. A device capable of churning the soil into a suitable seed bed for planting and permit a regulated amount of seed to be dispensed onto the seed bed and then churned into the prepared seed bed would greatly enhance the germination efficacy of the planted seed. A manually operated device which would allow for simultaneously tilling and covering of the dispensed seed within the tilled soil would also greatly enhance the efficacy of manually operated seeding devices. A device capable of simultaneously performing these multiple tilling and seeding operations with ease would be especially beneficial to horticulturists.

SUMMARY OF THE INVENTION

The tilling and seeding device of this invention is comprised of a tubular feed shaft equipped with a seed retaining chamber, a portal for loading the chamber with seeds, a handle for rotating a shaft about an orbital axis, a tined tilling member positioned on the distal end of the shaft and a seed valve regulating means for regulating the dispensing of seeds from the seed chamber. The tilling member serves to till the soil in a churning action such as ungrassed patches in a lawn by rotating the shaft and tined members about its vertical axis with a handle. The manually operated tilling and seeding device of this invention allows an operator to till a seed bed to a desired tilled or churned seed bed consistency and to simultaneously release a regulated amount of seed out onto the tilled seed bed while continually tilling and covering (e.g., churning) the seed dispensed by the device into the freshly tilled seed bed. The manipulative tasks of tilling the soil by churning to a desired uncompacted bed, seeding the bed and covering the seed within the bed by churning the soil with the tines can all be effectively conducted with the tilling and seeding device of this invention. The device is easy to operate requiring only nominal strength and skill for its operation. The churning activity of the device provides ideal seed preparation. The ability to regulate the seeding rate and churning of seed dispensed onto the seed bed significantly enhances the emergence of germinated seed from the seeded bed.

BRIEF DESCRIPTION OF THE DRAWINGS

FIG. 4 is another side view of the device with the handle shown in FIG. 1 rotated to an outwardly disposed position.

FIG. 5 is a bottom view of the device shown in FIG. 1.

FIG. 6 is partial cross-sectioned view of the device shown in FIG. 1 showing in more detail the seeding and tilling components of the device.

DETAILED DESCRIPTION OF THE INVENTION

Figure 1:
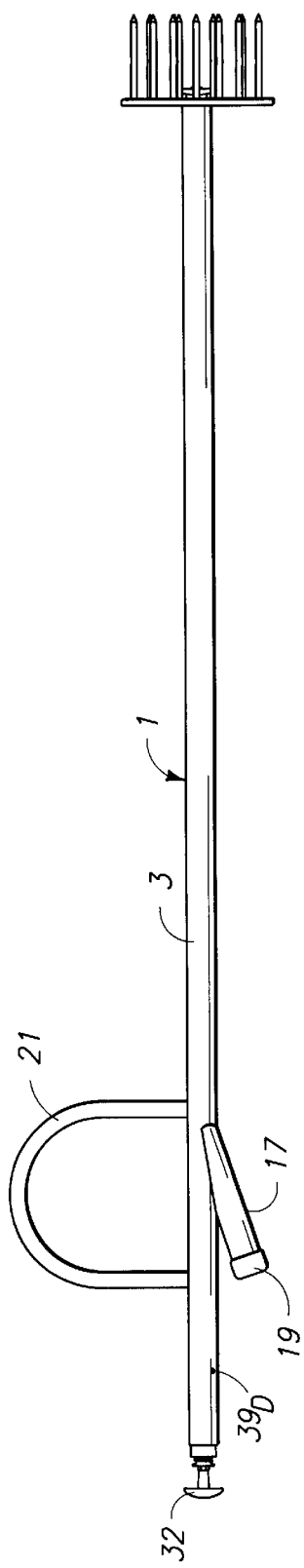
FIG. 1 is a side view of a tilling and seeding device of this invention.

Pursuant to the present invention, there is provided a tilling and seeding device 1 which allows a horticulturist to manually till by a churning action and seed a seed bed to a desired seed bed consistency. As a result a more complete germination of the seeded seeds is achieved. The seeding device 1, as illustrated in the figures comprises an elongated tubular shaft 3 having a seed chamber 5 housed within the shaft 3. The seed chamber 5 is equipped with a seed valve 35 which when activated by activating member 9 releases seed from chamber 5. Seed released through valve 35 communicates through seed passageway 11 through tine support plate 13 which includes a plurality of tillings tines 15. The positioning of the seeding dispensing end $3_E$ of shaft 3 and seed passageway 11 dispenses seed onto the seed bed in a manner which permits tilling tines 15 to churn and fold the dispensed seed into the seed bed.

The depicted seeding device 1 includes a seed filling port 17 capped by cap 19 which permits the horticulturist to replenish the seeding chamber 5 with seeds for planting. The seeding device 1 also includes a handle 21 which allows the operator to rotate the shaft 3 about its longitudinal axis. In rotating the device 1, the operator simply grasps the shaft 3 with one hand so as to permit the hand to function as a journal box to hold shaft 3 in a vertical position with the tilling tines 15 poised in a tilling position while rotating the handle 21 about the longitudinal axis with the other hand which in turn rotates the tines 15 so as to till the seed bed.

The rotating tines 15 serve to churn the soil into a churned seed bed of an ideal consistency for planting and germinating the planted seeds. Tine plate 13 is equipped with a plurality tilling tines 15 to permit the tilling or churnings of the seed bed to a desired planting consistency. The depicted tine plate 13 typically includes a sufficient number of tines 15 in a substantially uniform staggered relationship so as to permit effective tilling or churning of the seed bed when handle 21 is rotated about shaft 3. The number of tines 15 will typically be more than 10, advantageously more than 15 and preferably more than 20 tines 15. For most applications, effective tilling and churning may be accomplished with tines 15 numbering from about 20 to about 30.

The tine support plate 13 may be pre-fabricated from $\frac{1}{8}$ inch plate steel (or other suitable materials such as an impact resistant plastic) cut to a sufficient size to support tilling tines 15. Illustrative is a five (5) inch diameter plate 13 having a $\frac{15}{16}$ inch shaft aperture 23 for receiving the tubular shaft 3 drilled in the center of steel plate 13. The tine holes 25 (e.g. 24 holes at $\frac{3}{16}$ inch) may be drilled into the steel plate 13 in a patterned relationship so as to effectuate uniform tillage. Twenty (20) penny nails measuring $\frac{3}{16}$ inch×3 inches may be then inserted into the holes 25 and welded to tine plate 13 to provide tilling tines 15. Similarly, the tine plate 13 may be welded onto shaft aperture 23 at the distal end of shaft 3 while leaving a sufficient protrusion (e.g., $\frac{1}{4}$ inch–$\frac{1}{2}$ inch) of protruding end $3_E$ to permit valve 35 to operate while also providing room to weld shaft 3 onto tine plate 13. Positioning of the site for dispensing seeds at an internally disposed position within tine plate 13 and the positioning field of tines 15 in a staggered and uniform relationship provides an effective means for seeding the seed bed with device 1. A centrally disposed site within tine plate 13 is most effective for this purpose. A tubular protruding end $3_E$ provides a seed dispensing port for dispensing seed into the seed bed within the midst of tilling tines 15. As may be observed from the figures, protruding end $3_E$ of tubular shaft 3 houses a hollow passageway 29 exiting within tine plate 13 and tines 15 provides a particularly suitable opening for discharging the seeds from the seed chamber 5. By extending seed passageway 29 of protruding end $3_E$, at centrally disposed seed discharging site the seeds are discharged at an ideal position for churning the seed within the seed bed with tines 15. The seeds released may accordingly be simultaneously tilled or churned into the bed with tines 15.

The tines 15 are advantageously of a size and configuration so as to permit the soil to be easily churned. Tines 15 of a beveled or rounded leading edge to slice through the seed bed soil are most effective for this purpose. Beveled or rounded tines 15 or tines 15 with leading rounded or angular edges or surfaces provide a streamlined flow of the soil about tines 15 upon rotation of handle 21. Such tines 15 provide a leading or cutting edge which upon initial contact with the soil allows the soil to be more effectively cut and swept past the following soil contacting surfaces of tines 15. The inclusion of a plurality of tines 15 which effectively penetrate and cut the soil permits the seed bed to be more effectively churned into a seed bed of a desired consistency for planting. Tines 15 are preferably of a length and cross-sectional diameter so as to permit device 1 to be used with the minimum of effort. This allows not only the robust operators but also the weaker operators to effectively use device 1 with the minimum effort. Tines 15 of cross-sectional diameter of less than about $\frac{3}{8}$ inch and advantageously less than about $\frac{5}{16}$ inch have been found to be useful for this purpose. For most practical applications, expeditious tilling and churning of a seed without requiring excessive strength or force may be effectively accomplished with tines 15 having a cross-sectional diameter ranging from about $\frac{1}{8}$ inch to about $\frac{1}{4}$ inch.

Handle 21 radially extends outwardly from shaft 3 at a distance sufficient so as to provide effective leverage for rotating handle 21 about the longitudinal axis of shaft 3 while tilling with tines 15. Although extending handle 21 further outwardly increases the churning power of tines 15, the handle 21 if extended too far can become too cumbersome and difficult to operate. A handle 21 extending outward from shaft 3 at a distance of less than one foot and advantageously less than 7 inches will provide sufficient leverage to rotate tines 15 at the appropriate speed. When tines 15 are sized and configured so as to permit a shorter lengthed handle 21, handle 21 will typically extend radially outwardly from shaft 3 at about 4 inches to about 6 inches so as to provide sufficient leverage to effectively operate the tilling tines 15 in most planting applications. As well recognized, seed beds can vary considerably in the power required to effectively till the soil. Heavy clay soils typically require more leverage and power to till than lightly sandy looms. By optimizing the number, size and configuration of tines 15 as provided by device 1, more effective tilling and churning of a seed bed may be effectuated. Accordingly, tine 15 lengths may be designed so as to minimize power or the leverage requirements of the is operational use of device 1. For most applications, tines 15 will be of a length greater than 1 inch and less than 7 inches. By decreasing either number of the tines 15 or the tine diameter, tine length may then be increased so as to require substantially the same power or leverage to turn device 1. For a more balanced tilling or churning of the seed bed, tines 15 are preferably more than 1 inch in length and less than 5 inches in length, preferably of a length ranging from about 2 inches to about 4 inches and most preferably at about 3 inches in length.

Figure 2:
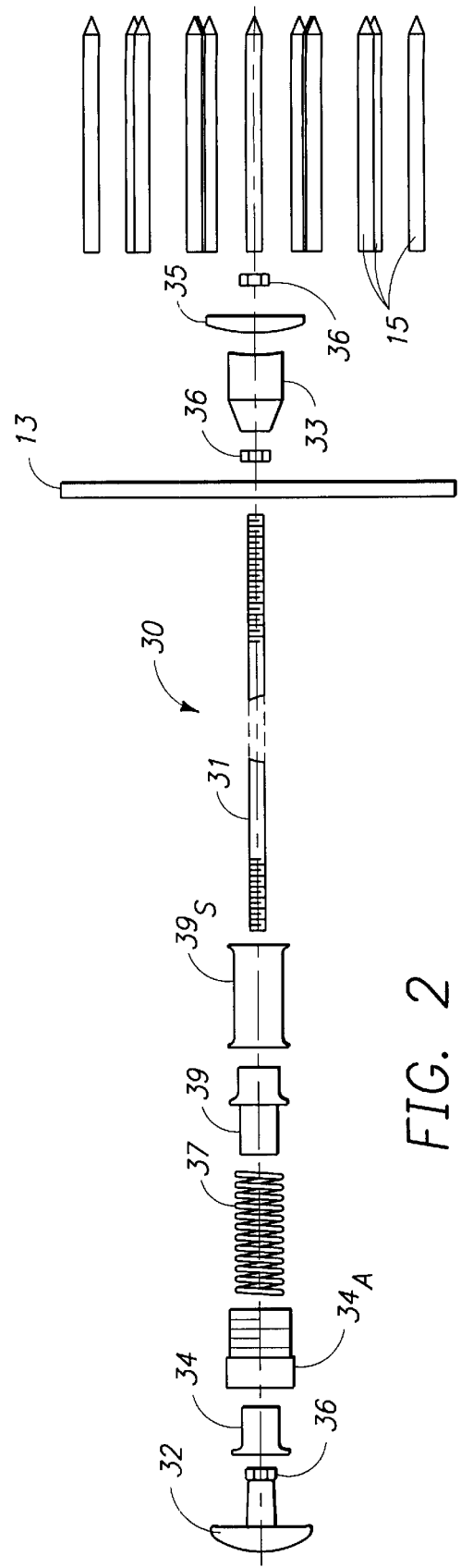
FIG. 2 is an exploded side view showing in greater detail the internally disposed tilling and seeding components of the device shown in FIG. 1.

The internal workings of the seeding device 1 may be seen by referring to FIGS. 2 and 6. The device 1 includes valving means (generally referred as 30) for discharging seeds from seed chamber 5. Tubular shaft 3 is a hollow shaft which houses seed chamber 5 and the valving mechanism 30 for discharging seeds onto the seed bed from chamber 5. The uppermost portion of shaft 3 is internally threaded so as to thread onto upper spring sleeve $34_A$ which serves as a stop for top bushing 34 and a housing for spring 37. The flared end of top bushing 34 rests against the uppermost surface of upper spring sleeve $34_A$. The valving mechanism 30 comprises a push rod 31 which extends throughout the entire length of the hollowed passageway 29 of tubular shaft 3. The distal end of push rod 31 is threaded for receiving valve guide 33 and valve 35 secured to push rod 31 by nuts 36. Valve guide 33 seats against shaft aperture 23 to seal the chamber 5 from discharging seeds. When valve 35 is pushed to an extended position by pushing rod knob 32, hollow passageway 29 and seed passageway 11 is opened so as to allow seed to be discharged from seed chamber 5. When valve 35 is retracted so as to seat against the protruding end $3_E$ of tubular shaft 3 then seed chamber 5 is closed. Push rod 31 at the proximate ends includes a push rod knob 32 and a top bushing 34 and a nut 36 for securing the bushing 34 to push rod 31. Top bushing 34 positioned below top nut 36 and a lower spring bushing 39 serve as stops for spring 37. Chamber sleeve $39_S$ seated against chamber 5 serves as stop for maintaining the spring 37 biased push rod 31 and valve guide 33 in a closed position. When it is desired to release seed from chamber 5, push rod knob 32 is pushed downwardly causing spring 37 to be compressed between upper 34 and lower bushing 33 forcing push rod 31 downwardly so as to open valve 35 and allow seeds to be released from chamber 5. When pressure is released front knob 32, spring 37 decompresses forcing the push rod 31 and valve guide 37 to the closed position. Sleeve $39_S$ may be suitably maintained at a distance of about 2½ inches from the top of shaft 3 by divots $39_D$ as shown in FIGS. 1 and 6.

Figure 3:
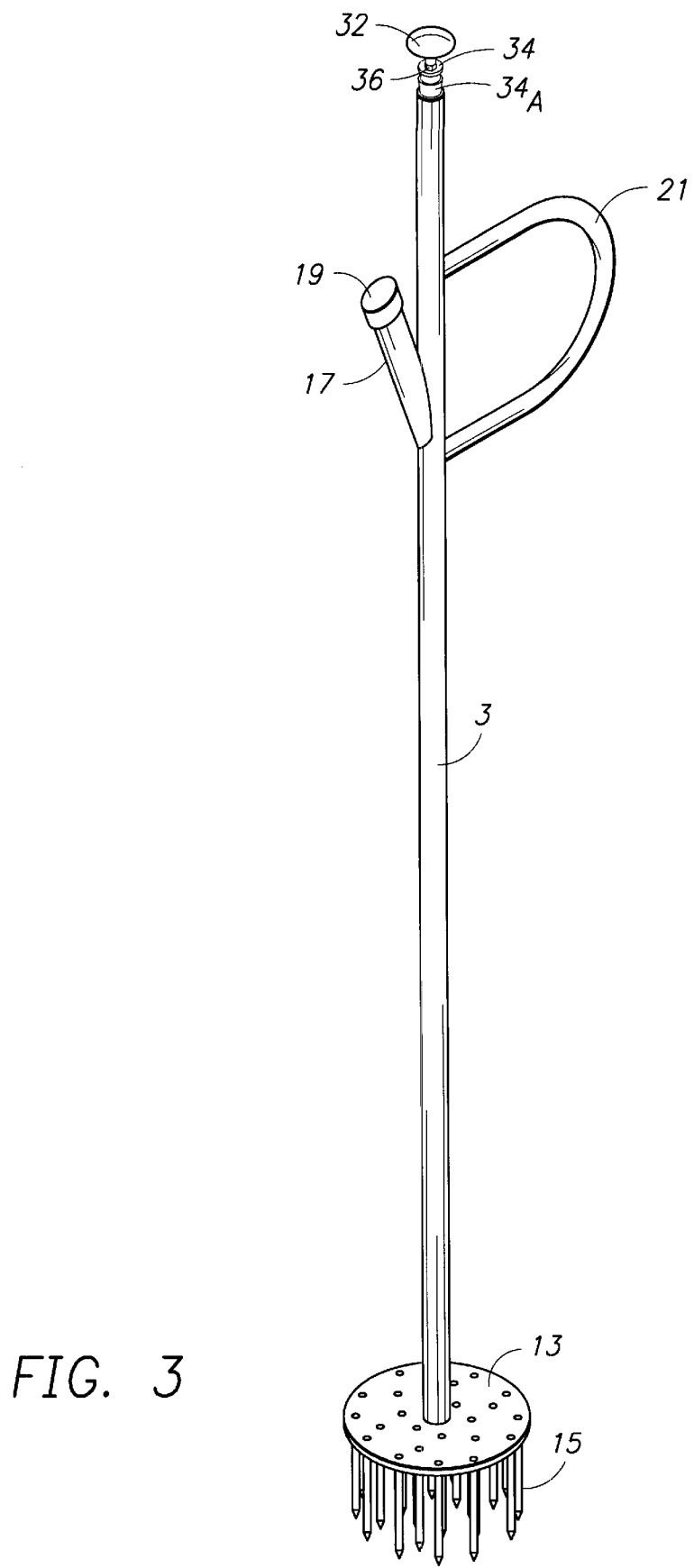
FIG. 3 is an elevated side view of the device shown in FIG. 1.

The seeding rate of device 1 may be regulated by regulating the clearance between valve 35 and its seat against protruding end $3_E$. Reducing the clearance between the seat and valve 35 reduces the clearance for seeds to pass therethrough and accordingly reduces the seeding rate. Conversely, increasing the clearance increases the seeding rate. Uppermost adjusting nut 36 which is shown as being adjacent to push knob 32 (e.g., see FIGS. 2–3 and 6) affords a convenient means for adjusting the clearance of valve 35. When uppermost nut 36 is tightened onto threaded push rod 31, valve 35 clearance is reduced so as to reduce the seeding rate or amount of seed flowing past valve 35. Conversely, untightening uppermost nut 36 from push rod 31 increases the clearance and flow rate of seed part valve 31. Adjusting nut 36 may also be used to effectively regulate the seeding rate for different sized seeds. Alternatively, the number of times or duration the operator presses knob 32 to open valve 35 can also be used to increase or decrease seeding rate.

Seed filling port 17 comprises a tubular filling port which communicates onto seed chamber 3 affording access for the replenishing of seed chamber 3 with fresh seed. Filling port 17 communicates onto seed chamber 3 at an open passageway 29 site positioned below lower spring bushing 39 thus avoiding closed structure for seeds of the uppermost valving mechanism 30. Filling port 17 extends radially outwardly and upwardly from seed chamber so as to permit gravitional filling of the device 1 with the desired seed. When it is desired to empty seed chamber 11 of seed, the device 1 may be merely inverted, cap 19 removed thus allowing seed to flow out of seed chamber 3 through filling port 17.

As evident from the aforementioned, the manually driven tilling and seeding device 1 may be equipped with power driven means (not shown) for rotating shaft 3. Examplary thereof are electrically driven motors (e.g., cord and battery powered cordless) which are equipped to rotate shaft 3. Similarly, conventional combustion engines may be utilized as a power source for rotating shaft 3. Since device 1 does not require a substantial amount of power to drive the tilling tines 15, compact, low powered electrical and combustion engine power sources may be used for this purpose.

What is claimed is:

1. A manual seeding device equipped to till a seed bed and to seed a tilled bed with a desired plant seed, said device comprising:

a) an elongated tubular shaft having a proximate end at one end of the shaft and a discharging end at an opposite end of the shaft;

b) a seed chamber housed within the shaft with said chamber being equipped with a feed inlet for filling the chamber with seed;

c) a seed valve at the discharging end of the chamber for discharging seed from the chamber;

d) an activating member for activating the seed valve so as to permit the discharge of seed from the chamber;

e) a tined member equipped with tilling tines at the discharging end of the shaft for tilling the seed bed, with said tined member including a seed dispensing port for discharging seed discharged from the chamber; and f) a handle disposed outwardly from the shaft so as to permit rotation of the tined member by rotating the handle about a longitudinal axis of the shaft so as to till the seed bed while also allowing for the discharging seed from the seed chamber with said seed valve.

2. The device according to claim 1 wherein the seed dispensing port exits within a field of tines.

3. The device according to claim 2 wherein the seed dispensing port comprises a seed passageway extension protruding outwardly from a supportive plate of the tines.

4. The device according to claim 1 wherein the tined member includes a plurality of projecting tilling tines arranged in a substantially uniform and staggered relationship.

5. The device according to claim 1 wherein the tined member includes a tine plate supportive of uniformly staggered tines of a number, size and configuration so as to provide substantially uniform churning of the seed bed with said tines.

6. The device according to claim 4 wherein the tined member includes more than 15 tines.

7. The device according to claim 6 wherein the tined member includes from about 20 to about 30 tines outwardly positioned upon a tine plate in a staggered relationship so as to provide substantially uniform penetration and tilling of the seed bed.

8. The device according to claim 1 wherein the activating member includes a push rod for pushing the valve to a seed dispensing position.

9. The device according to claim 8 wherein the push rod longitudinally extends the length of the shaft and includes a spring for biasing the push rod and the valve to the closed position and when the spring is compressed upon application of a pushing force upon the push rod then the push rod pushes the valve to the seed dispensing position.

10. The device according to claim 9 wherein the device includes a tubular seed filling port communicating onto the seed chamber at an entry site positioned below the spring.

11. A method of tilling and seeding a seed bed with a manual seeding device equipped with an elongated tubular shaft having a proximate end at one end of the shaft and a discharging end at an opposite end of the shaft; a seed chamber for housing a desired seed within the shalt with said chamber being equipped with a feed inlet for filling the chamber with the seed; a seed valve at the discharging end of the chamber for discharging the seed from the chamber; an activating member for activating the seed valve so as to discharge seed from the chamber; a tined member at the discharging end of the shaft for tilling the seed bed with said tined member having a seed dispensing port in operational communication with the valve for dispensing seed dispensed through the seed valve; and a handle disposed outwardly from the shaft so as to permit rotation of the shaft and the tined member by rotating the handle about a longitudinal axis of the shaft so as to permit tilling of the seed bed while discharging seed from the seed chamber with said seed valve; said method compromising:
  a) placing the desired seed for seeding the seed bed in the seed chamber;
  b) holding the seeding device in a tilling position;
  c) rotating the handle about the longitudinal axis of the shaft while maintaining the tines in the tilling position so as to cause the tines to till the seed bed;
  d) discharging the seed from the seed chamber; and
  e) covering the discharged seed within said seed bed with said tines.

12. The method according to claim 11 wherein the discharging of the seed from the chamber of the device is conducted concurrently with the rotating of the handle about the longitudinal axis of the shaft.

13. The method according to claim 11 wherein the device includes a spring biasing a push rod attached to the valve to a closed position and when the spring is compressed with the push rod, the push rod then opens the valve to a seed dispensing, position which method includes a step of pushing the push rod to the seed dispensing position so as to dispense from the seed chamber.

14. The method according to claim 13 which includes pushing the push rod to the seeding position so as to seed the seed bed with a desired number of seeds and then teriminiatiing the pushing of the push rod so as to permit the spring to bias the push rod and attached valve to the closed valve position.

* * * * *